US012111620B2

(12) United States Patent
Nagarathinam et al.

(10) Patent No.: US 12,111,620 B2
(45) Date of Patent: Oct. 8, 2024

(54) MULTI-AGENT DEEP REINFORCEMENT LEARNING FOR DYNAMICALLY CONTROLLING ELECTRICAL EQUIPMENT IN BUILDINGS

(71) Applicant: Tata Consultancy Services Limited, Mumbai (IN)

(72) Inventors: Srinarayana Nagarathinam, Chennai (IN); Avinash Achar, Chennai (IN); Arunchandar Vasan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 318 days.

(21) Appl. No.: 17/029,788

(22) Filed: Sep. 23, 2020

(65) Prior Publication Data

US 2021/0200163 A1  Jul. 1, 2021

(30) Foreign Application Priority Data

Dec. 13, 2019  (IN) .............................. 201921051885

(51) Int. Cl.
  *G05B 13/02* (2006.01)
  *F24F 11/62* (2018.01)
  (Continued)

(52) U.S. Cl.
  CPC ............ *G05B 13/027* (2013.01); *F24F 11/62* (2018.01); *G05B 15/02* (2013.01); *G06N 3/088* (2013.01)

(58) Field of Classification Search
  CPC .............................. G05B 15/02; G06N 3/088
  See application file for complete search history.

(56) References Cited

U.S. PATENT DOCUMENTS 10,438,305 B2 * 10/2019 Song ..................... G06F 1/3203
10,977,551 B2 *  4/2021 Van Seijen ............ G06N 5/043
(Continued)

FOREIGN PATENT DOCUMENTS

CN          110454874 A   * 11/2019  .............. F24F 11/46

OTHER PUBLICATIONS

Machine Translation for CN-110454874-A, obtained Sep. 2022 (Year: 2022).*

(Continued)

*Primary Examiner* — Darrin D Dunn
*Assistant Examiner* — Vi N Tran
(74) *Attorney, Agent, or Firm* — FINNEGAN, HENDERSON, FARABOW, GARRETT & DUNNER LLP

(57) ABSTRACT

Reinforcement Learning agent interacting with a real-world building to determine optimal policy may not be viable due to comfort constraints. Embodiments of the present disclosure provide multi-deep agent RL for dynamically controlling electrical equipment in buildings, wherein a simulation model is generated using design specification of (i) controllable electrical equipment (or subsystem) and (ii) building. Each RL agent is trained using simulation model and deployed in the subsystem. Reward function for each subsystem includes some portion of reward from other subsystem(s). Based on reward function of each RL agent, each RL agent learns an optimal control parameter during execution of RL agent in subsystem. Further, a global optimal control parameter list is generated using the optimal control parameter. The control parameters in the global optimal control parameters list are fine-tuned to improve subsystem's performance. Information on fine-tuning parameters of the subsystem and reward function are used for training RL agents.

15 Claims, 8 Drawing Sheets

(51) Int. Cl.
  *G05B 15/02* (2006.01)
  *G06N 3/088* (2023.01)

(56) References Cited

U.S. PATENT DOCUMENTS

| | | | | |
|---|---|---|---|---|
| 11,526,812 | B2* | 12/2022 | Devlin | G06N 3/008 |
| 2013/0031036 | A1* | 1/2013 | Kojima | G06N 20/00 |
| | | | | 706/12 |
| 2013/0117420 | A1* | 5/2013 | Han | H04W 40/32 |
| | | | | 709/220 |
| 2017/0031330 | A1* | 2/2017 | Shiraishi | G06N 7/01 |
| 2018/0165602 | A1* | 6/2018 | Van Seijen | G06N 3/08 |
| 2019/0353379 | A1* | 11/2019 | Lee | F24F 11/50 |
| 2019/0361411 | A1* | 11/2019 | Park | H04L 67/12 |
| 2019/0368103 | A1* | 12/2019 | Choung | D06F 33/48 |
| 2019/0378020 | A1* | 12/2019 | Camilus | G06N 20/00 |
| 2020/0053312 | A1* | 2/2020 | Mukherjee | H05B 47/19 |
| 2020/0160168 | A1* | 5/2020 | Yang | G06N 3/006 |
| 2020/0167834 | A1* | 5/2020 | Matsuoka | G06Q 30/0278 |
| 2020/0234197 | A1* | 7/2020 | Osogami | G06N 3/08 |

OTHER PUBLICATIONS

Lin, Kaixiang, et al. "Efficient large-scale fleet management via multi-agent deep reinforcement learning." Proceedings of the 24th ACM SIGKDD international conference on knowledge discovery & data mining. 2018. (Year: 2018).*

Rasheed, Muhammad Babar, et al. "Intelligent multi-agent based multilayered control system for opportunistic load scheduling in smart buildings." IEEE Access 7 (2019): 23990-24006. (Year: 2019).*

Vázquez-Canteli, José R., and Zoltán Nagy. "Reinforcement learning for demand response: A review of algorithms and modeling techniques." Applied energy 235 (2019): 1072-1089. (Year: 2019).*

Vázquez-Canteli, José et al., "Adaptive Multi-Agent Control of HVAC Systems for Residential Demand Response Using Batch Reinforcement Learning", Building Performance Analysis Conference, Sep. 2018, Ashrae.Org., https://www.ashrae.org/File%20Library/Conferences/Specialty%20Conferences/2018%20Building%20Performance%20Analysis%20Conference%20and%20SimBuild/Papers/C094.pdf.

Nguyen, Thanh Thi et al., "Deep Reinforcement Learning for Multi-Agent Systems: A Review of Challenges, Solutions and Applications", Computer Science, 2019, Arxi.org https://arxiv.org/pdf/1812.11794.pdf.

Guisi, Douglas M. et al., "Reinforcement Learning with Multiple Shared Rewards", The International Conference on Computational Science, 2016, vol. 80, pp. 855-864, Elsevier, https://reader.elsevier.com/reader/sd/pii/S1877050916308511?token=EE0D34F26DB3D615EDB5522BE97D07525C291AAC7F7EF901B830689D638829CC0EC08C56E187C966368B3BC90F549224.

Gupta, Jayesh K. et al., "Cooperative Multi-Agent Control Using Deep Reinforcement Learning", Autonomous Agents and Multiagent Systems, 2017, Springer, http://ala2017.it.nuigalway.ie/papers/ALA2017_Gupta.pdf.

* cited by examiner

MULTI-AGENT DEEP REINFORCEMENT LEARNING FOR DYNAMICALLY CONTROLLING ELECTRICAL EQUIPMENT IN BUILDINGS

PRIORITY CLAIM

This U.S. patent application claims priority under 35 U.S.C. § 119 to: India Application No. 201921051885, filed on Dec. 13, 2019. The entire contents of the aforementioned application are incorporated herein by reference.

TECHNICAL FIELD

The disclosure herein generally relates to multi-agent deep reinforcement learning techniques, and, more particularly, to multi-agent deep reinforcement learning for dynamically controlling electrical equipment in buildings.

BACKGROUND

Building equipment (e.g., such as Heating, Ventilation and Air Conditioning equipment, lighting systems) can consume as much as 50% of the overall building energy. Rising cost of energy has led to deployment of various building energy conservative measures. These generally include not only simple schedule-based and rule-based operations, but also more complex methods of optimal control through model-based approaches. Although schedule and rule-based strategies are easy to realize in practice, they are often sub-optimal either in terms of energy or occupant comfort or both. On the other hand, model based predictive control have been shown to perform much better than simple strategies. However, developing a calibrated model of a building that is required for the Model predictive control (MPC) is complex. Model involves not only predicting the temperature and humidity evolutions in buildings but also need energy models for each building equipment and their associated inertia or time-constants.

MPC assumes a deterministic model on the dynamical system and essentially solves a (receding) finite-horizon optimal control problem at every step. The optimal control law can be solved numerically by posing the control problem as a deterministic constrained optimization problem. However, a deterministic model assumption of MPC can be restrictive. Designing optimal controllers under a stochastic system model for a finite horizon setting can be achieved using dynamic programming techniques (backward recursion). However, this is feasible in general only for finite state spaces. Under continuous state spaces, designing optimal controllers is feasible only for simple systems. Also, both MPC and stochastic optimal control methods assume complete knowledge of the system model (model-based) whose dynamics need control. Even if the system model is known, high fidelity system models can render the controller design task computationally hard.

Reinforcement learning techniques can circumvent most of the above challenges. It is a model-free approach where the learning agent directly interacts with the system (to be controlled), receives (partial) feedback in the form of rewards in response to the actions taken by the agent. The agent progressively refines its policy (control law) by trying out different actions as it balances exploiting its current knowledge versus exploring unseen actions/states. These techniques in addition to being model-free can further tackle continuous state spaces as well (naturally arise in temperature, humidity and control models) which make them a very attractive alternative for traditional optimal control approaches.

These challenges in the traditional approaches and availability of large volumes of data in building in recent times due to rising growth in IoT have led the use of machine learning based methods. Among other methods, Reinforcement learning (RL) is a class of machine learning where in an agent (or decision maker) interact with an environment (in our case buildings) to learn the optimal policy that maximizes accumulated rewards. RL was shown to be promising for building equipment control. However, conventional approaches dealt with only specific constraint parameters (for example, in case of HVAC subsystems, parameter such as building air temperature set-point as control action using a single agent). However, in reality considering real-world scenarios the performance of such equipment is not at par given constraints and specification of the entire building and these scenarios do not account other performance affecting factors.

SUMMARY

Embodiments of the present disclosure present technological improvements as solutions to one or more of the above-mentioned technical problems recognized by the inventors in conventional systems. For example, in one aspect, there is provided a processor implemented method that implements multi-agent deep reinforcement learning for dynamically controlling electrical equipment in buildings. The method comprises obtaining, via one or more hardware processors, input data comprising (i) design specification of one or more controllable electrical equipment installed and operating in the building and (ii) design details of the building associated thereof; generating, via the one or more hardware processors, a simulation model using the input data; training, via the one or more hardware processors, a plurality of deep Reinforcement learning (RL) agents using the generated simulation model; deploying, via the one or more hardware processors, each of the plurality of trained deep RL agents in the one or more controllable electric equipment in the building, wherein each of the plurality of trained deep RL agents monitors one or more states affecting performance of the one or more controllable electric equipment in the building, wherein during an execution of each of the plurality of trained RL agents, a reward function is assigned to each of the plurality of trained RL agents, and wherein the reward function comprises an energy component and a penalty; triggering, via the one or more hardware processors, each of the plurality of trained deep RL agents, to obtain a portion of the reward function associated with another deep RL agent; and estimating, via the one or more hardware processors, a global optimal control parameter list based on at least one optimal control parameter associated with each of the plurality of trained deep RL agents, wherein the at least one optimal control parameter is learnt by each of the plurality of trained deep RL agents during an execution of the plurality of trained deep RL agents deployed in the one or more controllable electric equipment in the building.

In an embodiment, the one or more controllable electrical equipment comprises one of one or more heating, ventilation, and air conditioning (HVAC) subsystems, one or more lighting equipment, computing loads systems or combinations thereof.

In an embodiment, the one or more states comprise at least one of temperature, humidity, one or more ambient parameters, lighting intensity, and occupant density.

In an embodiment, the penalty comprises at least one of thermal discomfort, visual discomfort, and stability or degradation information of an associated controllable electrical equipment.

In an embodiment, the at least one optimal control parameter comprises at least one of set point temperature, lighting intensity set point, and scheduling information of an associated controllable electrical equipment.

In another aspect, there is provided a system that implements multi-agent deep reinforcement learning for dynamically controlling electrical equipment in buildings. The system comprises a memory storing instructions; one or more communication interfaces; and one or more hardware processors coupled to the memory via the one or more communication interfaces, wherein the one or more hardware processors are configured by the instructions to: obtain input data comprising (i) design specification of one or more controllable electrical equipment installed and operating in the building and (ii) design details of the building associated thereof; generate a simulation model using the input data; train a plurality of deep Reinforcement learning (RL) agents using the generated simulation model; deploy each of the plurality of trained deep RL agents in the one or more controllable electric equipment in the building, wherein each of the plurality of trained deep RL agents monitors one or more states affecting performance of the one or more controllable electric equipment in the building, wherein during an execution of each of the plurality of trained RL agents, a reward function is assigned to each of the plurality of trained RL agents, and wherein the reward function comprises an energy component and a penalty; trigger each of the plurality of trained deep RL agents to obtain a portion of the reward function associated with another deep RL agent; and estimate a global optimal control parameter list based on at least one optimal control parameter associated with each of the plurality of trained deep RL agents, wherein the at least one optimal control parameter is learnt by each of the plurality of trained deep RL agents during an execution of the plurality of trained deep RL agents deployed in the one or more controllable electric equipment in the building.

In an embodiment, the one or more controllable electrical equipment comprises one of one or more heating, ventilation, and air conditioning (HVAC) subsystems, one or more lighting equipment, computing loads systems or combinations thereof.

In an embodiment, the one or more states comprise at least one of temperature, humidity, one or more ambient parameters, lighting intensity, and occupant density.

In an embodiment, the penalty comprises at least one of thermal discomfort, visual discomfort, and stability or degradation information of an associated controllable electrical equipment.

In an embodiment, the at least one optimal control parameter comprises at least one of set point temperature, lighting intensity set point, and scheduling information of an associated controllable electrical equipment.

In yet another aspect, there are provided one or more non-transitory machine-readable information storage mediums comprising one or more instructions which when executed by one or more hardware processors cause implementing multi-agent deep reinforcement learning for dynamically controlling electrical equipment in buildings by obtaining, via the one or more hardware processors, input data comprising (i) design specification of one or more controllable electrical equipment installed and operating in the building and (ii) design details of the building associated thereof, generating, via the one or more hardware processors, a simulation model using the input data; training, via the one or more hardware processors, a plurality of deep Reinforcement learning (RL) agents using the generated simulation model; deploying, via the one or more hardware processors, each of the plurality of trained deep RL agents in the one or more controllable electric equipment in the building, wherein each of the plurality of trained deep RL agents monitors one or more states affecting performance of the one or more controllable electric equipment in the building, wherein during an execution of each of the plurality of trained RL agents, a reward function is assigned to each of the plurality of trained RL agents, and wherein the reward function comprises an energy component and a penalty; triggering, via the one or more hardware processors, each of the plurality of trained deep RL agents, to obtain a portion of the reward function associated with another deep RL agent; and estimating, via the one or more hardware processors, a global optimal control parameter list based on at least one optimal control parameter associated with each of the plurality of trained deep RL agents, wherein the at least one optimal control parameter is learnt by each of the plurality of trained deep RL agents during an execution of the plurality of trained deep RL agents deployed in the one or more controllable electric equipment in the building.

In an embodiment, the one or more controllable electrical equipment comprises one of one or more heating, ventilation, and air conditioning (HVAC) subsystems, one or more lighting equipment, computing loads systems or combinations thereof.

In an embodiment, the one or more states comprise at least one of temperature, humidity, one or more ambient parameters, lighting intensity, and occupant density.

In an embodiment, the penalty comprises at least one of thermal discomfort, visual discomfort, and stability or degradation information of an associated controllable electrical equipment.

In an embodiment, the at least one optimal control parameter comprises at least one of set point temperature, lighting intensity set point, and scheduling information of an associated controllable electrical equipment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As mentioned above, challenges in the traditional approaches and availability of large volumes of data in building in recent times due to rising growth in IoT has led the use of machine learning based methods. Among other methods, Reinforcement learning (RL) is a class of machine learning where in an agent (or decision maker) interact with an environment (in present disclosure case it is buildings) to learn the optimal policy that maximizes accumulated rewards. RL was shown to be promising for building equipment control. However, conventional approaches dealt with only specific constraint parameters (for example, in case of HVAC subsystems, parameter such as building air temperature set-point as control action) using a single agent. Considering real-world scenarios, the performance of such equipment is not at par given constraints and specification of the entire building and these scenarios do not account other performance affecting factors. In other words, to realize an optimal control from a whole building perspective, it is necessary to account for other equipment such as components affecting performance.

Figure 1:
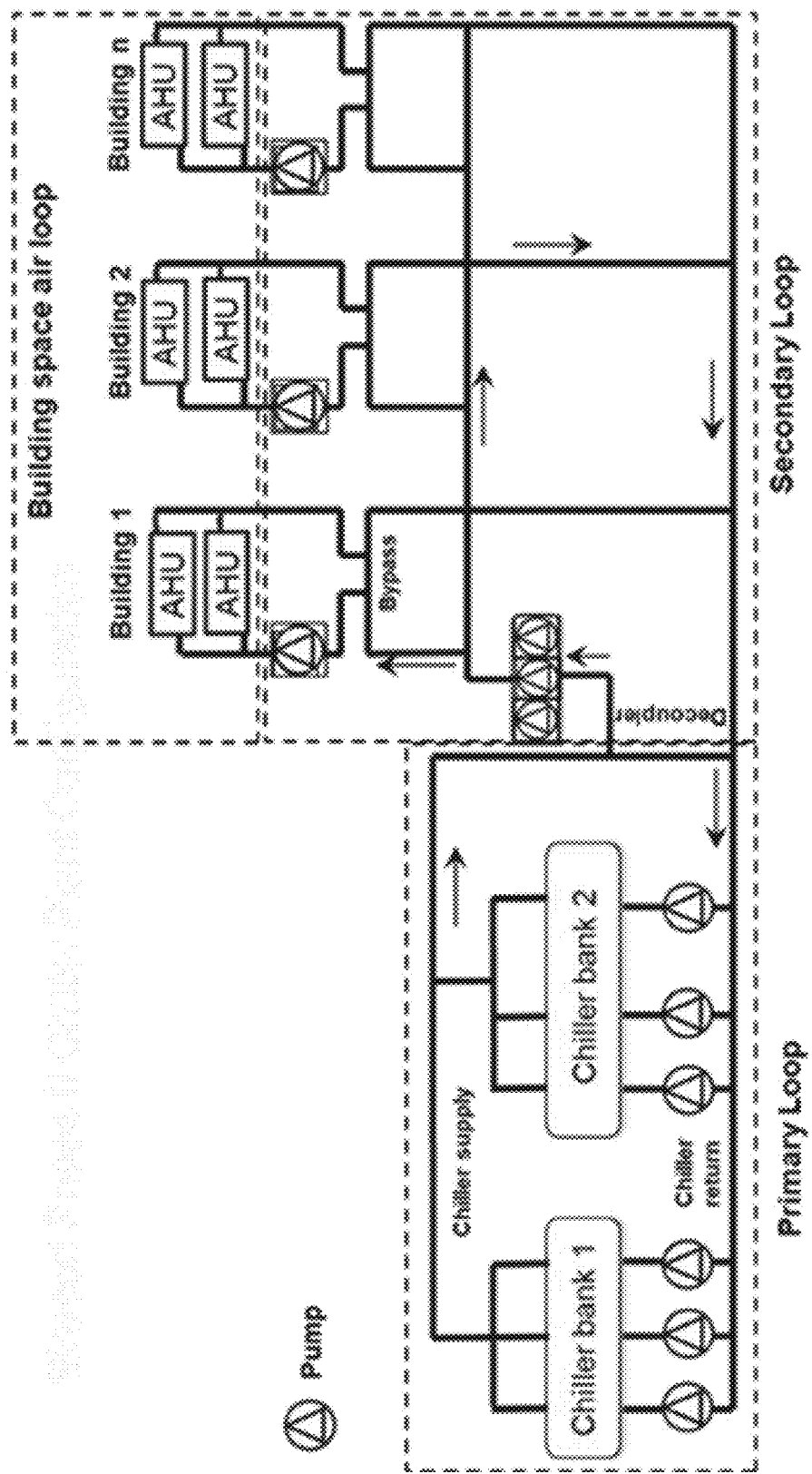
FIG. 1 illustrates a conventional heating, ventilation, and air conditioning (HVAC) loop of a building.

FIG. 1 illustrates a conventional heating, ventilation, and air conditioning (HVAC) loop of a building. A building generally has complex HVAC sub-systems interacting with each to achieve the primary goal of conditioning the air workspace to comfort requirements as depicted in FIG. 1. These include a primary loop comprising of chillers and cooling towers and their associated pumps and fans, a secondary loop that transport the chiller water to building space air handling unit (AHU) through pumps and an air loop where the warm return building air exchanges heat with chiller water in AHU, gets cooled and is recirculated back in the building space. These complex sub-systems have their own controlled variables. It is possible to use a single agent collectively deciding the set-points of all sub-systems. However, it was shown in other domains that decomposing a single agent to multi-agents helps not only in reducing the dimensionality of the problem but also increases the training examples available for each agent. Further, decomposing also helps in efficient 'transfer learning' for similar sub-systems present elsewhere. Embodiments of the present disclosure provide systems and methods that implement a multi-agent based Deep reinforcement learning for learning the optimal control policy. RL agent interacting with a real-world building to determine optimal policy may not be viable due to comfort constraints (exploring the reward for various set-points can severely affect comfort). Due to this, the RL agent is trained offline using a simplistic model in the present disclosure. A simplistic model (also referred as 'simulation model' or an 'abstract model') can be constructed using the design details of the building envelope (construction materials, orientation, etc.) and electrical equipment (or controller equipment) which includes HVAC, lighting and computing assets, to name a few. Once the model has trained sufficiently well, it can further learn by interacting the real-world setting in an online fashion. In the present disclosure, an offline training model is built by abstracting the complex HVAC loops into three loops namely: a primary chilled water loop; a secondary chilled water loop; and an air loop.

Referring now to the drawings, and more particularly to FIGS. 2 through 8, where similar reference characters denote corresponding features consistently throughout the figures, there are shown preferred embodiments and these embodiments are described in the context of the following exemplary system and/or method.

Figure 2:
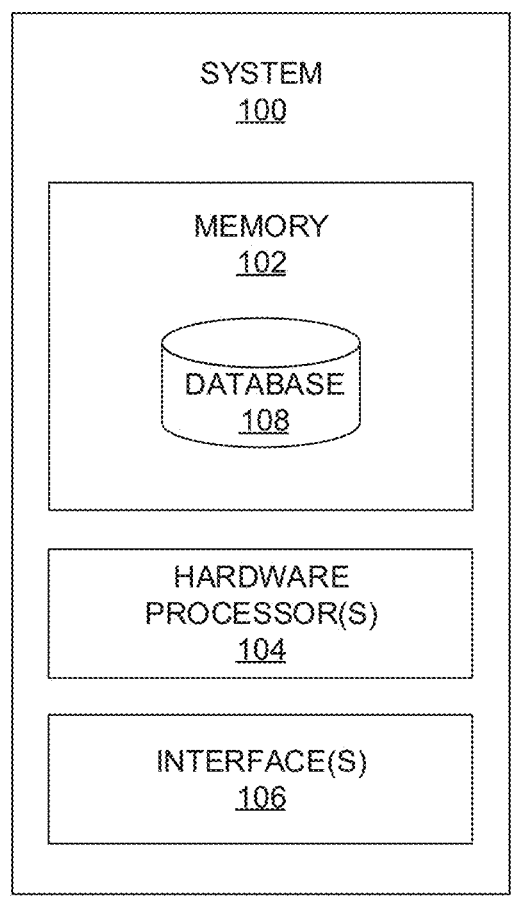
FIG. 2 depicts an exemplary block diagram of a system that implements a multi-agent deep reinforcement learning for dynamically controlling electrical equipment in buildings, in accordance with an embodiment of the present disclosure.

FIG. 2 depicts an exemplary block diagram of a system 100 that implements a multi-agent deep reinforcement learning for dynamically controlling electrical equipment in buildings, in accordance with an embodiment of the present disclosure. The system 100 may also be referred as 'multi-agent deep reinforcement learning system', 'optimal control system', 'control device', 'dynamic control system' and may be interchangeably used hereinafter. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information, for example, (a) input data comprising (i) design specification of one or more controllable electrical equipment installed and operating in the building and (ii) design details of the building associated thereof, simulation model generated for the building for real-world scenarios, (b) information on (i) training a plurality of deep Reinforcement learning (RL) agents wherein the RL agents are comprised in the memory 102, (ii) deployment of each of the plurality of trained deep RL agents in the one or more controllable electric equipment in the building, (iii) reward function obtained by one RL agent from another RL agent during execution of respective RL agents in sub-systems that are installed and being operated in the building and/or premises, (iv) learned optimal control parameter associated with each of the plurality of trained deep RL agents, (v) global optimal control parameter list, and the like. In one embodiment, the global control parameter list comprises optimal control parameter learnt by each RL agent during execution thereof in the corresponding controllable electric equipment (e.g., also referred as 'electric equipment'). Further, the memory 102 comprises information pertaining to one or more states affecting performance of the one or more controllable electric equipment in the building, wherein the one or more states may include but are not limited to, temperature, humidity, ambient parameters (e.g., solar radiation), lighting intensity, occupant density, or combinations thereof. The memory 102 further stores information pertaining to reward functions of each RL agent, wherein the reward function comprises an energy component and penalty. Penalty comprises one of thermal discomfort, visual discomfort, stability or degradation information of an associated controllable electrical equipment, or combinations thereof. The optimal control parameters that are learnt during RL agent execution and stored in the memory 102 comprise at least one of set point temperature, lighting intensity set point, and scheduling information of an associated controllable electrical equipment. The memory 102 may store (or stores) one or more techniques (e.g., machine learning models/techniques, and the like). The memory 102 further comprises (or may further comprise) information pertaining to input(s)/output(s) of each step performed by the systems and methods of the present disclosure. More specifically, information pertaining to dynamic optimal control of electrical equipment and the like, may be stored in the memory 102. In other words, input(s) fed at each step and output(s) generated at each step are comprised in the memory 102 and can be utilized in further processing and analysis.

Figure 3:
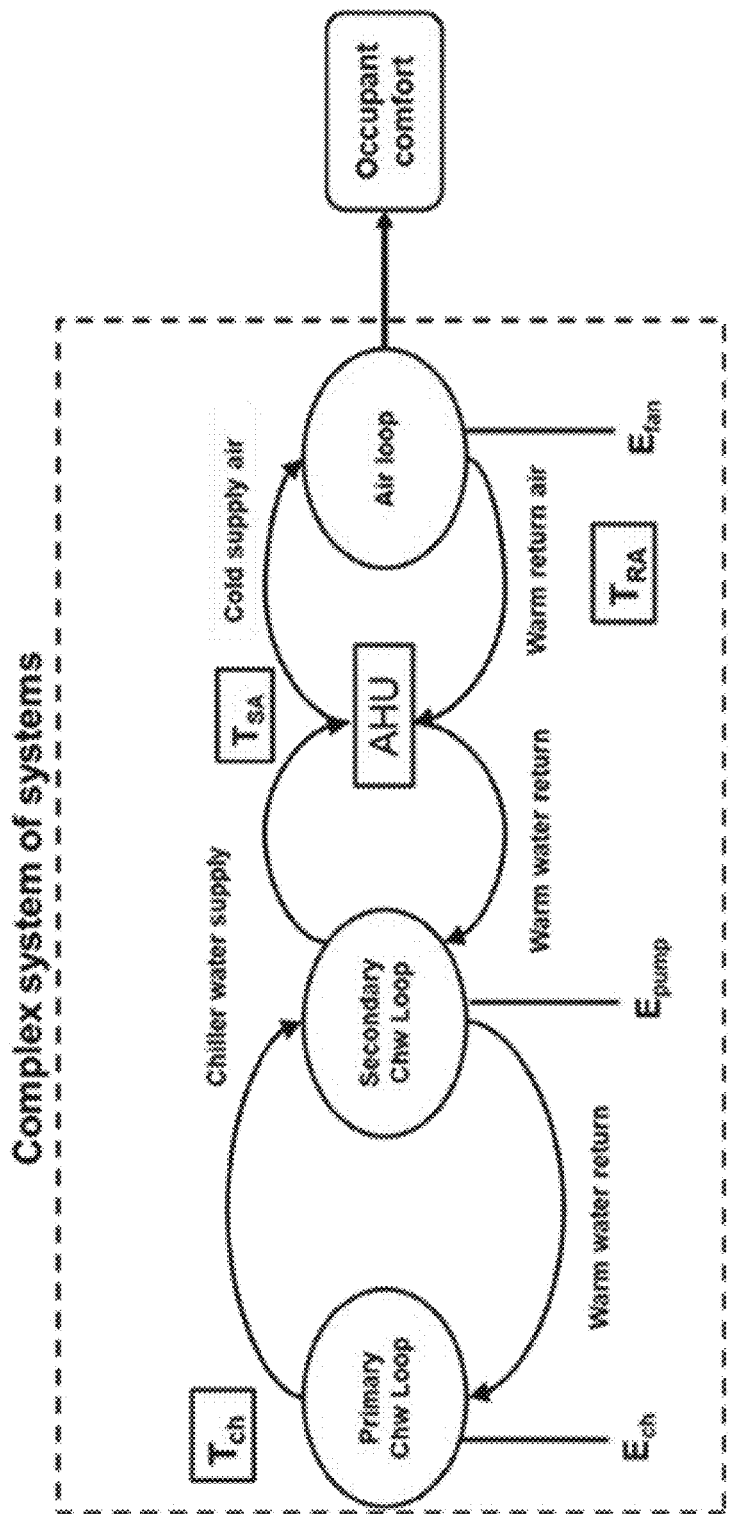
FIG. 3 depicts a building HVAC loop abstraction using the system of FIG. 2 in accordance with an embodiment of the present disclosure.

FIG. 3, with reference to FIG. 2, depicts a building HVAC loop abstraction using the system 100 of FIG. 2, in accordance with an embodiment of the present disclosure. As mentioned above, in the present disclosure an offline training model is built by abstracting the complex HVAC loops into three loops namely: the primary chilled water loop (also referred as primary loop and interchangeably used hereinafter); secondary chilled water loop; and air loop. It is to be understood by person having ordinary skill in the art or person skilled in the art that for the sake of brevity a HVAC system is illustrated wherein system is implemented for optimal control of the HVAC system. It is to be understood by person having ordinary skill in the art or person skilled in the art that the above example of implementing the system 100 in HVAC system for optimal control of the HVAC system shall not be construed as limiting the scope of the present disclosure. In other words, the system 100 can be implemented for dynamic control of any electric equipment or smart automation systems. For instance, electric equipment of smart automation systems may comprise but are not limited to, computer systems, tube lights, bulbs, televisions, audio systems, printing/scanning machines, cooling systems, refrigerators, heaters, washing machines, and the like.

Referring to FIG. 3 once again, in building HVAC loop abstraction the primary loop mainly consists of the chillers and primary pumps (normally constant speed pumps) that cools the warm return water from building to leaving chilled water setpoint, $T_{chsp}$. The energy consumption of the primary loop ($E_{ch}$) is mainly from the chiller compressor and primary pumps. This chilled water from the primary loop is pumped to the air handling units (AHUs) located in the building through secondary loop pumps. An AHU is essentially a heat-exchanger that cools the warm return air from building space. There are two controlled variables associated with the air loop. First, the supply air temperature setpoint ($TSA_{sp}$) is maintained by actuating the secondary loop pumps. Second, the building space air temperature setpoint ($TRA_{sp}$) is maintained by actuating the AHU supply. The controller of these parameters is normally of proportional-integral-derivative (PID) type. The energy consumption of the secondary loop ($E_{pump}$) is from the secondary pumps, while the energy consumption of the air loop $E_{fan}$ is from the AHU supply fan. All these systems interact to meet the occupant comfort.

Figure 4:
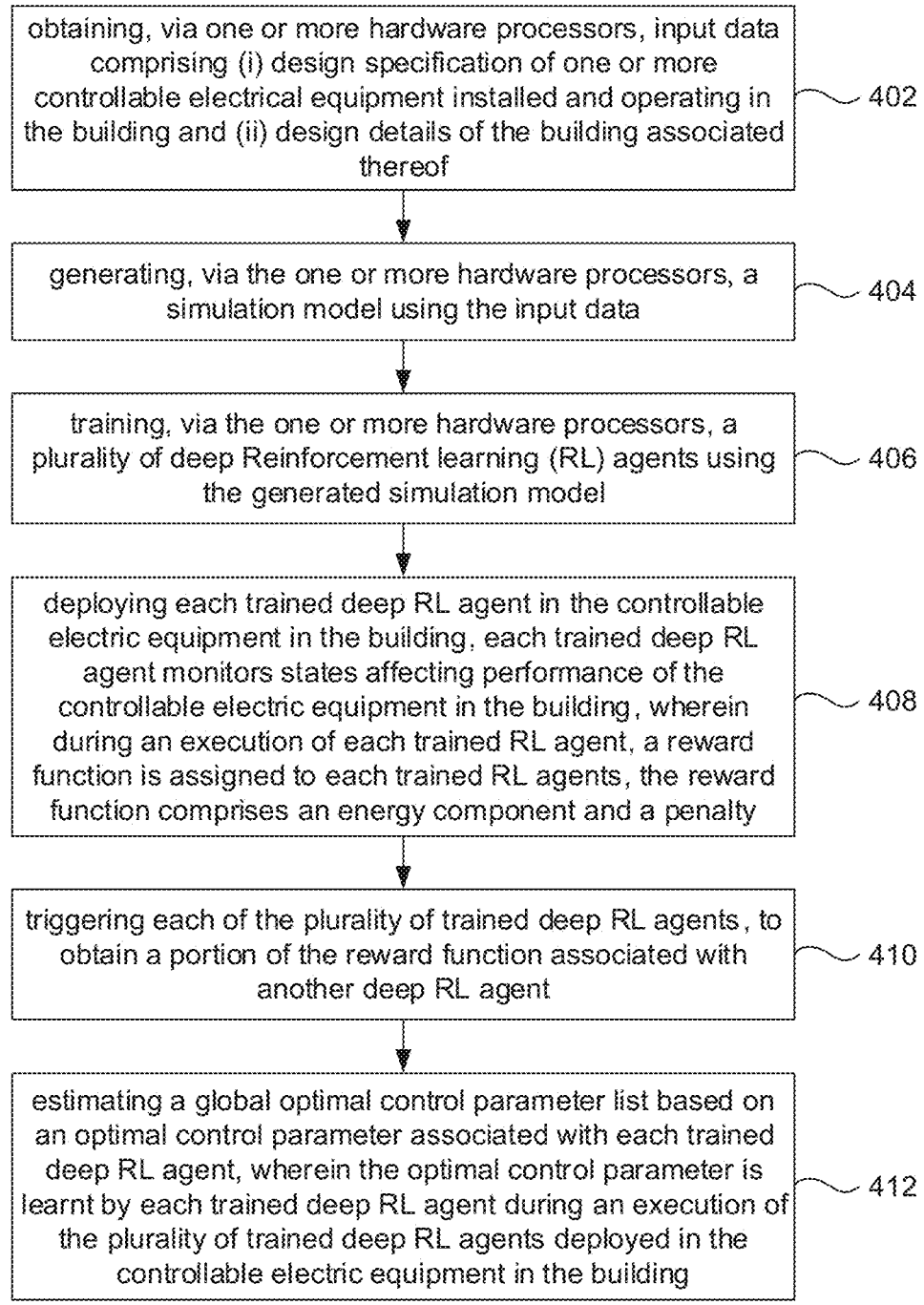
FIG. 4 depicts an exemplary flow chart illustrating a multi-agent deep reinforcement learning method for dynamically controlling electrical equipment in buildings using system of FIG. 2 in accordance with an embodiment of the present disclosure.

FIG. 4, with reference to FIGS. 2-3, depicts an exemplary flow chart illustrating a multi-agent deep reinforcement learning method for dynamically controlling electrical equipment in buildings using system 100 of FIG. 2 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 2, components of the building HVAC loop abstraction of FIG. 3, the flow diagram as depicted in FIG. 4 and FIGS. 5-8. At step 402 of the present disclosure, the one or more hardware processors 104 obtain input data comprising (i) design specification of one or more controllable electrical equipment installed and operating in the building and (ii) design details of the building associated thereof. For instance, design details of the building may include but are not limited to conditioned floor area=20000, design occupancy density=100 square feet/person, design lighting load density=1 W/square feet, design electrical load density=1 W/square feet. Design specification of the one or more controllable electrical equipment installed and being operated in the building may include, but are not limited to, chiller design tonnage and power consumption=900 TR, 500 kW, pump design flowrate and power consumption=2100 GPM, 90 kW, AHU design tonnage, flowrate and consumption=20 TR, 20000 CFM and 6 kW. The one or more controllable electrical equipment comprises one of one or more HVAC subsystems, one or more lighting equipment (e.g., tube light, LED bulb, etc.), computing loads systems (e.g., computer systems, inverters, etc.) or combinations thereof, in one example embodiment. It is to be understood by person having ordinary skill in the art or person skilled in the art that example for optimal control of the HVAC system is shown for better understanding of the embodiments of the present disclosure and shall not be construed as limiting the scope of the present disclosure.

Figure 5:
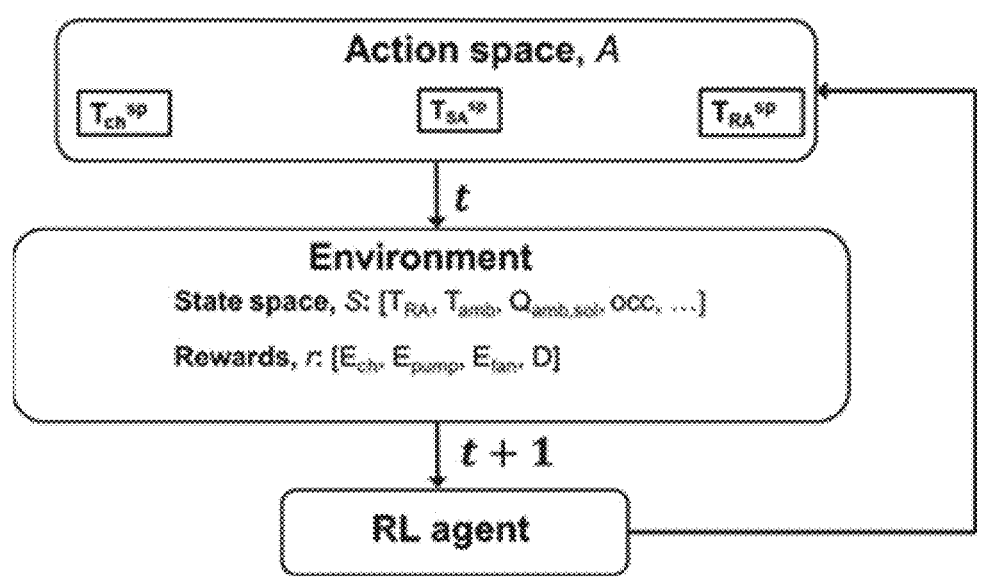
FIG. 5 depict a Reinforcement Learning (RL) framework as implemented by the system of FIG. 2, in accordance with an embodiment of the present disclosure.
Figure 6:
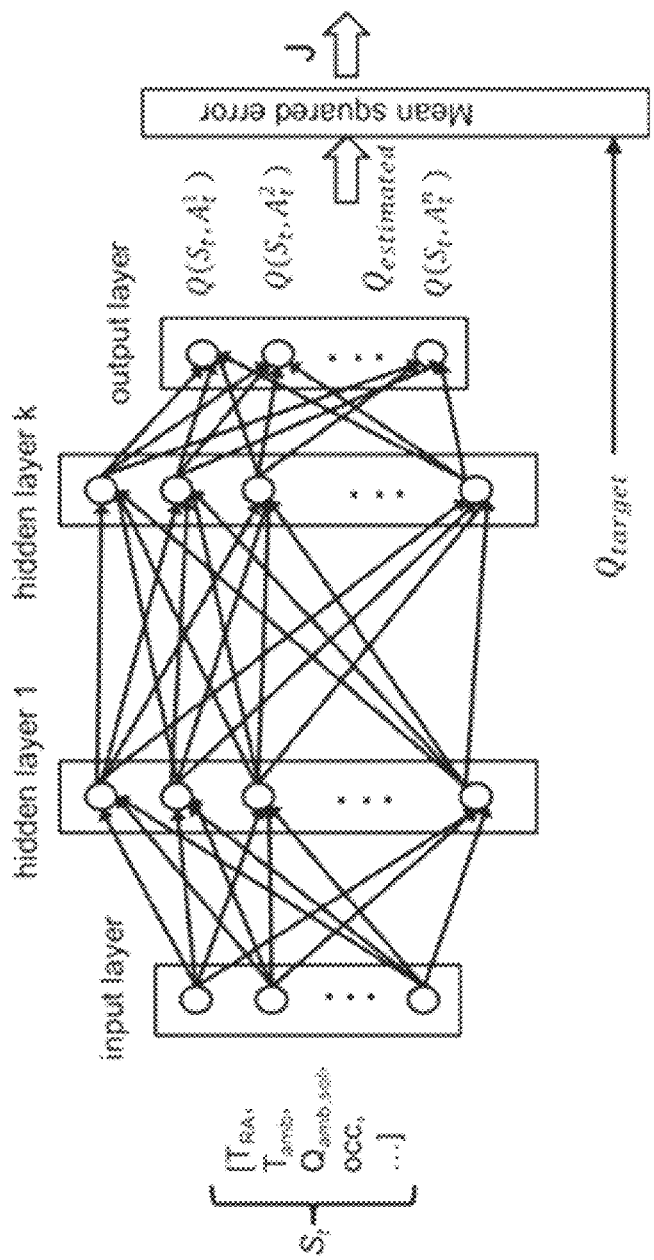
FIG. 6 depicts a deep Q-network in accordance with an embodiment of the present disclosure.

At step 404 of the present disclosure, the one or more hardware processors 104 generate a simulation model (also referred as 'abstract model') using the input data. At step 406 of the present disclosure, the one or more hardware processors 104 train a plurality of deep Reinforcement learning (RL) agents using the generated simulation model (wherein the generated simulated model is comprised in the memory 102). FIG. 5, with reference to FIGS. 2 through 4, depict a Reinforcement Learning framework as implemented by the system 100 of FIG. 2, in accordance with an embodiment of the present disclosure. It is understood by person having ordinary skill in the art or person skilled in the art that RL comes under the class of ML where a RL agent interacts with the environment and learns to act using a Markov Decision Process (MDP) method. Generally, MPDs are defined by a tuple consisting the environment state, action taken, resulting reward and a transition probability. Specifically, the tuple is given by $\langle S, A, P, r \rangle$ where S is the state space, A is the action space, P is the transition probability of environment state being $S^{t+1}$ at time t+1 as a result of choosing an action A in state $S^t$ at time t and R is the immediate reward received after transiting from state $S^t$ to $S^{t+1}$.

Further, one of the most popular methods for RL is the Q-learning algorithm. The algorithm maintains a Q-value table of all state-action (S, A) values. During the building HVAC operation, the idea is to maximize the accumulated rewards $$R = \sum_{i=1}^{\infty} \gamma^{i-1} r_{t+i}$$

where $\gamma$ is the discount factor and takes a value in the range [0,1]. The discount factor decides how important future rewards are and is normally user defined depending on the problem. Let $Q^\pi(S_t, a_t)$ represent the optimal value, that is, the maximum accumulated rewards obtained by taking an $a_t$ at $S_t$. $Q^\pi(S_t, a_t)$ can be obtained by recursive calculation of the Bellman Equation, as below, $$Q^\pi(S_t, a_t) = E\left[r_{t+1} + \gamma \max_{a_{t+1}} Q^\pi(S_{t+1}, a_{t+1}) \vee (S_t, a_t)\right] \quad (1)$$

The Q-values are updated using, $$Q_{t+1}(S_t, a_t) = (1-\alpha)Q_t(S_t, a_t) + \alpha\left[r_{t+1} + \gamma \max_{a_{t+1}} Q_t(S_{t+1}, a_{t+1})\right] \quad (2)$$

where $\alpha$ is the learning rate and takes values in the range [0, 1].

The above equation (2) is expected to converge over a time-period under MDP formulation. A major concern with Q-table approach is that it does not scale with increase in cardinality of the (finite) state space. In most applications, the state space either needs to be modelled in a continuous fashion (ii) when discrete and finite, the cardinality is typically very large. To tackle this issue, Q-function is represented not as a table but as a parameterized function based on supervised learning approach(es). Artificial neural network models (and their modern deep versions) have been the most popular choice of these parametrized Q-functions. To this end, FIG. 6, with reference to FIGS. 2 through 5, depicts a deep Q-network in accordance with an embodiment of the present disclosure. The weights (w) in the network are updated using mini-batch gradient descent, $$w = w - \alpha \frac{\partial J}{\partial w}$$

where J is the cost function given by, $$J = \frac{1}{2n} \sum_{i=1}^{n} [Q_{target} - Q_{estimated}]^2.$$

The target Q-value is given by $$Q_{target} = r_{t+1} + \gamma \max_{a_{t+1}} Q_t(S_{t+1}, a_{t+1}).$$

Referring to steps of FIG. 4 again, at step 408 of the present disclosure, the one or more hardware processors 104 deploy each of the plurality of trained deep RL agents in the one or more controllable electric equipment in the building. Each of the plurality of trained deep RL agents monitors one or more states affecting performance of the one or more controllable electric equipment in the building. During an execution of each of the plurality of trained RL agents, a reward function is assigned to each of the plurality of trained RL agents wherein the reward function comprises an energy component and a penalty. The one or more states comprise at least one of temperature, humidity, ambient parameters (e.g., solar radiation), lighting intensity, and occupant density. In the present disclosure, for the example, HVAC system in the building that needs to be dynamically controlled, the state variables $S_t$ may comprise of the actual building air temperature $T_{RA}$, building air relative humidity, ambient parameters such as temperature, humidity and solar radiation, building occupancy count, lighting intensity, and the like, wherein a state space vector $S_t$ may be defined as $S_t$={building temperature, ambient temperature, ambient relative humidity, ambient solar radiation, occupancy count, building space lighting lux}, $S_t$={25° C., 35° C., 70%, 1000 W/m², 180, 130 lux} respectively. Reward space R may be defined as R={chiller energy, pump energy, AHU energy, occupancy discomfort percentage}, R={400 KW, 80 kW, 5 kW, 25%} respectively.

The reward function comprises at least an energy component. For instance, in the example of HVAC system as considered by the present disclosure, the reward function here may consists of the energy consumption of chiller plant $E_{ch}$, secondary loop pumps $E_{pump}$, AHU supply fan $E_{fan}$ and occupant thermal discomfort D. Usually, the notion is to maximize the reward. In that sense, the reward function can be defined as r=($a_0 E_{ch} + a_1 E_{pump} + a_2 E_{fan} + a_3 D$), where $a_0$, $a_1$, $a_2$ and $a_3$ are the user defined weightage coefficients. Further depending on the objective, the reward function may further comprise a penalty indicative of visual comfort, fatigue of the HVAC equipment resulting from frequent cycling, etc. In other words, penalty comprises at least one of thermal discomfort, visual discomfort, stability or degradation information of an associated controllable electrical equipment, or combinations thereof.

Figure 7:
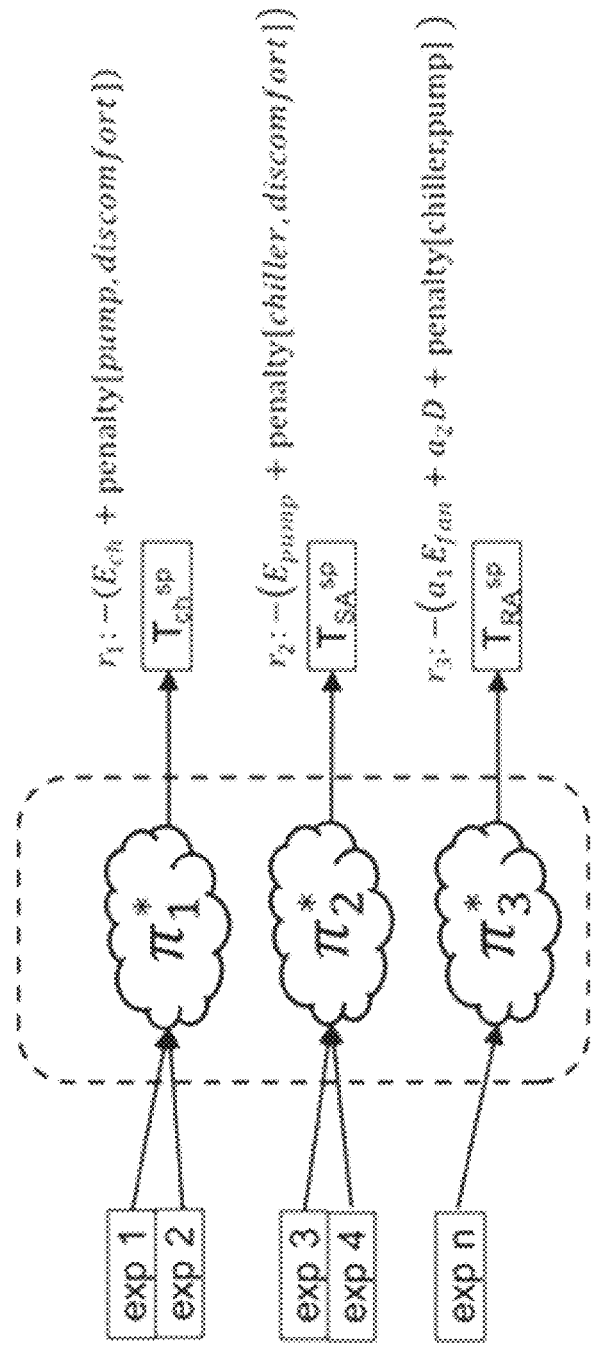
FIG. 7 depicts a multi-agent RL framework as implemented by the system of FIG. 2, in accordance with an embodiment of the present disclosure.

It is possible that all sub-systems do not affect one another. Instead the effect of an action in one sub-system may be seen only in nearby sub-systems. In such case, it may be good to have multiple RL agent as against one single super-agent. It was shown in other domains that such decomposition of RL agents not only reduces the dimensionality of the input and output space, but also increases the number of samples available for training in per agent. In the present application, there are three action variables ($T_{chsp}$, $TSA_{sp}$, $TRA_{sp}$) and each action may vary over some range depending on the granularity of control possible. Typically for temperature setpoints the resolution is 1° C. Further the input features for each agent can be effectively segregated instead of having one large state space and associated resolution. Towards this end, embodiments of the present disclosure implement a multi-agent RL framework. FIG. 7, with reference to FIGS. 2 through 6, depicts a multi-agent RL framework as implemented by the system 100 of FIG. 2, in accordance with an embodiment of the present disclosure.

At step 410 of the present disclosure, each of the plurality of trained deep RL agents obtain, via the one or more hardware processors 104, a portion of the reward function associated with another deep RL agent. In the present disclosure, portion of the reward function may comprise, energy component only, penalty only or combination of both energy component and as well as penalty. Each agent arrives at its own optimal policy π*. It may be noted that the rewards of each agent are coupled implicitly. For example, the chilled setpoints affects chilled energy $E_{ch}$, secondary pump energy $E_{pump}$ and occupancy discomfort D (depending on the dehumidification at the AHU coils). Likewise, the building space setpoint $TRA_{sp}$ in addition to affecting the supply fan energy $E_{fan}$ and discomfort D, also affects the chiller energy $E_{ch}$ depending on the cooling load.

Alternative example of obtaining reward function by RL agent from another RL agent deployed in electrical equipment or appliance such as computer server and tube light. More specifically, considering a room having only a computer server and a tube-light. In such scenarios, lighting intensity could be a portion of the reward function associated with a RL agent comprised in tube light that may be obtained by the RL agent comprised in the computer server. In other words, independent states of the equipment affecting performance may be attributed as a portion of the reward function. Example of independent states of the equipment may comprise temperature, humidity, ambient parameters (e.g., solar radiation), lighting intensity and the like.

Figure 8:
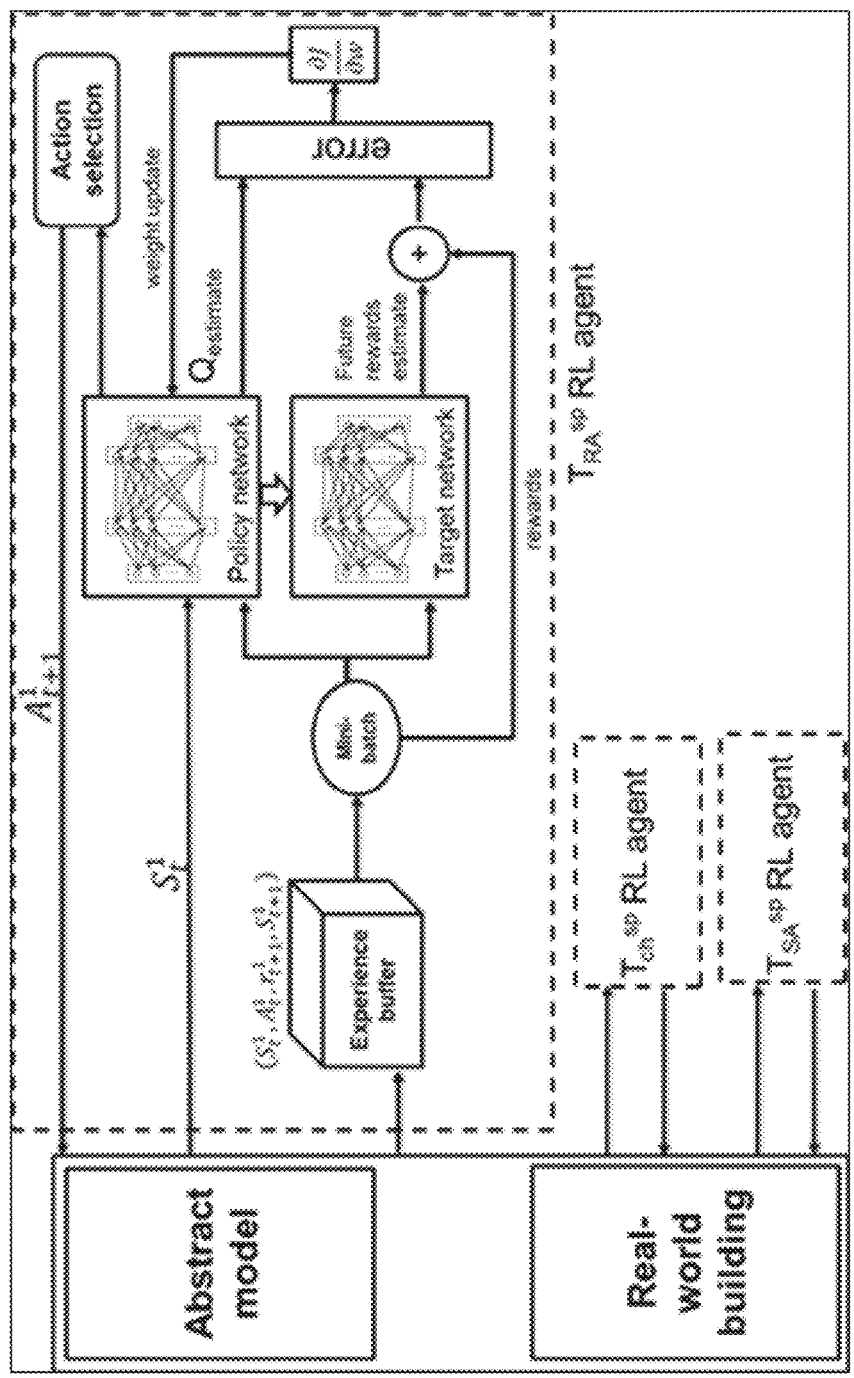
FIG. 8 depicts the multi-agent RL framework for building HVAC control as implemented by the system of FIG. 2, in accordance with an embodiment of the present disclosure.

The information on reward function obtained by one RL agent from another RL agent may be further utilized for training the RL agents for better optimal control of the electrical equipment in the future which may result in lower number of data samples required particularly when it comes to online training of the RL agent. Further, having multiple agents can also help in transfer learning. Consider for example, a building space of similar size and utility in the same geography, however with a different primary and secondary loop setup. In such case, it may be possible to just transfer the optimal policy learnt for building space alone $TRA_{sp}$ to be used here. With a single agent, the whole training process must be repeated since all the actions space are coupled ($T_{chsp}$, $TSA_{sp}$, $TRA_{sp}$). Hence the need for a multi-deep agent reinforcement learning framework for dynamically controlling electrical equipment. FIG. 8, with reference to FIGS. 2 through 7, depicts a multi-agent RL framework for building HVAC control as implemented by the system 100 of FIG. 2, in accordance with an embodiment of the present disclosure. Below examples illustrate a scenario of one RL agent obtaining at least a portion of a reward function of another RL agent:

$r1=(E_{ch}+\text{factor}*\text{discomfort})$, $r1=(350 \text{ kW}+10*25\%)$ $r2=(E_{pump}+\text{factor}*E_{ch})$, $r1=(80 \text{ kW}+0.1*350 \text{ kW})$ $r3=(E_{AHU\,fan}+\text{factor1}*\text{discomfort}+\text{factor2}*E_{ch})$, $r1=(5 \text{ kW}+0.1*25\%+0.01*350 \text{ kW})$ In FIG. 8, details the components of one of the RL agents, specifically $TRA_{sp}$. It is to be noted and understood by person having ordinary skill in the art and person having skilled in the art that other RL agents in the subsystems or systems (e.g., electrical equipment such as HVAC system) installed and being operated in the building have similar components. The abstract model is mainly used for offline training. Once the agent performs reasonably well on the offline model, it can used for online training. The hypothesis is that the agent can learn quicker in real-world if trained well on offline model. The approach is discussed on the offline model and is identical for the online case.

In the learning phase, the tuples ($S_t, a_t, r_{t+1}, S_{t+1}$) are stored in experience buffer. A mini batch is sampled for the network training. At the beginning of time, the buffer has zero memory and network weights are initialized to some random values. It is well-known that the network requires target values. Unlike supervised learning there are no target or labeled values here in the implementation of the present disclosure. Hence, a separate neural network is created (and is (or may be) stored in the memory 102 for execution) for calculating the target value. This network is periodically updated by copying parameters from the other network. This is performed mainly due to the two reasons: to remove the correlation between target and estimated Q-values; and to make the target values stationary.

Upon obtaining portion of the reward function, at step 412 of the present disclosure, a global optimal control parameter list is estimated or generated based on learned optimal control parameter associated with each of the plurality of trained deep RL agents. The learned optimal control parameters are estimated or determined during the execution of each of the plurality of trained deep RL agents in respective system(s) of the building. The control parameters in the global optimal control parameters list are fine-tuned to improve subsystem's performance. Information on fine-tuning parameters of the subsystem and reward function are used for training RL agents. Optimal control parameter learnt during an execution of each RL agent may vary from RL agent to RL agent and subsystem to subsystem (also referred as controllable electrical equipment). For instance, in one subsystem (e.g., say 'HVAC system A') the optimal control parameter learnt during RL agent execution could be set point temperature. In another subsystem (e.g., say 'HVAC system B') the optimal control parameter learnt during RL agent execution could be lighting intensity set point. In yet another (e.g., say 'HVAC system C') the optimal control parameter learnt during RL agent execution could be scheduling information of an associated controllable electrical equipment. For instance, scheduling information may be (i) automatic turn ON and OFF of the 'HVAC system C', (ii) temperature controlling of the 'HVAC system C', (iii) fan speed control of the 'HVAC system C', and the like.

Below illustrated is a pseudo code of multi-agent deep reinforcement learning for dynamically controlling electrical equipment in buildings as implemented by the system 100 of the present disclosure, by way of an example and shall not be construed as limiting the scope of the present disclosure:

Pseudo Code for Dynamically Controlling Electrical Equipment in Buildings

Initialize number of Episodes M, number of Epochs T, mini-batch size M, learning rate α, discount factor λ, number of RL agents A

```
For each agent j in A,
    initialize policy network weights w_j^p
    initialize the policy network weights w_j^t
    initialize replay buffer size B_j
For episode = 1, M do
    Reset building environment to initial state
    For epoch = 1, T do
        For each agent j = 1, A do
            Select action a_t^j according to current policy and a noise (epsilon-
            greedy approach)
        End
        Each RL agent executes the action
        Observe next state of each sub-system S_{t+1}^j
        Observe reward of each sub-system S_t^j
        Re-define the reward of each sub-system to take a portion of other
        sub-system // e.g., r_t^{j-1} = r_t^{j-1} + w * r_t^{j-2} //
        For each agent j = 1, A do
            Store transition (S_t, r_t^j, S_{t+1}) in buffer B_j
            Sample a random mini batch from buffer
            Calculate target Q-values using target network
            Train the policy network by minimizing a loss function
            Update target network weights every few epochs
        End
    End
End
```

As discussed above, single-agent RL has been utilized for building control for controlling the building air temperature setpoints in the conventional art. Embodiments of the present disclosure provide multi-agent deep reinforcement learning for dynamically controlling electrical equipment in buildings. For sake of brevity and for better understanding of the embodiments of the present disclosure, HVAC systems have been considered as illustrative examples and these examples shall not be construed as limiting the scope of the present disclosure. Since a large portion of HVAC energy comes for the chiller plant, it is important to consider them in the building HVAC control problems.

As mentioned, all sub-systems may not affect one another. Instead the effect of an action in one sub-system may be seen only in nearby sub-systems. In such case, it may be good to have multiple agent as against one single super-agent. Conventionally, it is shown that such decomposition of agents not only reduces the dimensionality of the input and output space, but also increases the number of samples available for training in per agent. In the present disclosure, for HVAC system under use case scenario, action variables such as chiller water setpoint, supply air temperature setpoint, and building comfort air temperature setpoint were considered. Each action may vary over some range depending on the granularity of control possible. The reward function of one RL agent includes at least a portion of reward function of another RL agent. This helps in improving the accuracy of learning and training of RL agents for determining optimal control parameter during execution of each RL agent which is used for generating a global optimal control parameters list. The control parameters in the global optimal control parameters list can be (or are) fine-tuned for better performance and effective utilization of subsystems installed and being operated in the building.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining, via one or more hardware processors, input data comprising (i) a design specification of one or more controllable electrical equipment installed and operating in a building and (ii) design details of the building associated thereof;
   generating, via the one or more hardware processors, a simulation model using the input data, wherein the simulation model is built in offline by abstracting complex Heating, ventilation, and air conditioning (HVAC) loops of the building into three loops wherein the three loops are a primary chilled water loop, a secondary chilled water loop, and an air loop, and an energy consumption of the primary loop is $E_{ch}$, an energy consumption of the secondary loop is $E_{pump}$, an energy consumption of the air loop is $E_{fan}$;
   training, via the one or more hardware processors, a plurality of deep Reinforcement learning (RL) agents using the generated simulation model, wherein the plurality of deep RL agents interacts with an environment of the building and learns to act using a Markov Decision Process (MDP) method;
   deploying, via the one or more hardware processors, each of the plurality of trained deep RL agents in the one or more controllable electric equipment of the building, wherein
      the primary chilled water loop is assigned with a first deep trained RL agent of the plurality of trained deep RL agents,
      the secondary chilled water loop is assigned with a second deep trained RL agent of the plurality of trained deep RL agents, and
      the air loop is assigned with a third deep trained RL agent of the plurality of trained deep RL agents,
      each of the plurality of trained deep RL agents monitors one or more states affecting performance of the one or more controllable electric equipment in the building,
      during an execution of each of the plurality of trained RL agents, a reward function is assigned to each of the plurality of trained RL agents,
      the reward function comprises an energy component of the one or more controllable electrical equipment and a penalty,
      the reward function comprises an energy component, and
      the penalty includes a visual feedback of an associated controllable electrical equipment and degradation information of the associated controllable electrical equipment,
      the reward function of the first deep trained RL agent is $r1=E_{ch}+a$ factor*the visual feedback,
      the reward function of the second deep trained RL agent is $r2=E_{pump}+$the factor*$E_{ch}$, and
      the reward function of the third deep trained RL agent is $r3=E_{fan}+a$ factor1*the visual feedback+a factor2*$E_{ch}$;
   triggering, via the one or more hardware processors, each of the plurality of trained deep RL agents, to obtain a portion of the reward function associated with another deep RL agent, wherein
      a first trained deep RL agent of the plurality of trained deep RL agents obtains a first specific portion of the portion of the reward function from a second trained deep RL agent of the plurality of trained deep RL agents,
      the first specific portion of the reward function includes the energy component only, the penalty only or combination of both the energy component and the penalty,
      the first specific portion of the reward function include the energy component and the penalty,
      the first trained deep RL agent is associated with a first controllable electrical equipment of the one or more controllable electrical equipment,
      the second trained deep RL agent is associated with a second controllable electrical equipment of the one or more controllable electrical equipment, and
      information on the portion of the reward function is utilized for training the plurality of trained deep RL agents;
   estimating, via the one or more hardware processors, based on the obtained portion of the reward function, a global optimal control parameter list based on an optimal control parameter associated with each of the plurality of trained deep RL agents, wherein the optimal control parameter is learnt by each of the plurality of trained deep RL agents during an execution of the plurality of trained deep RL agents deployed in the one or more controllable electric equipment in the building, wherein the optimal control parameter comprises scheduling information of the associated controllable electrical equipment; and
   fine tuning a plurality of control parameters of the global optimal control parameter list to improve a performance of each of the plurality of trained deep RL agents.

2. The processor implemented method of claim 1, wherein the one or more controllable electrical equipment comprises one of one or more heating equipment, a ventilation system, and air conditioning (HVAC) subsystems, one or more lighting equipment, computing loads systems, or combinations thereof.

3. The processor implemented method as claimed in claim 1, wherein the one or more states comprise at least one of a temperature, a humidity, one or more ambient parameters, a lighting intensity, and an occupant density.

4. The processor implemented method as claimed in claim 1, wherein the penalty further comprises a thermal feedback.

5. The processor implemented method as claimed in claim 1, wherein the optimal control parameter comprises a set point temperature, and a lighting intensity set point.

6. A system, comprising:
a memory storing instructions;
one or more communication interfaces; and
one or more hardware processors coupled to the memory via the one or more communication interfaces, wherein the one or more hardware processors are configured by the instructions to:
obtain input data comprising (i) a design specification of one or more controllable electrical equipment installed and operating in a building and (ii) design details of the building associated thereof;
generate a simulation model using the input data, wherein the simulation model is built in offline by abstracting complex Heating, ventilation, and air conditioning (HVAC) loops of the building into three loops wherein the three loops are a primary chilled water loop, a secondary chilled water loop, and an air loop, and an energy consumption of the primary loop is $E_{ch}$, an energy consumption of the secondary loop is $E_{pump}$, an energy consumption of the air loop is $E_{fan}$;
train a plurality of deep Reinforcement learning (RL) agents using the generated simulation model, wherein the plurality of deep RL agents interacts with an environment of the building and learns to act using a Markov Decision Process (MDP) method;
deploy each of the plurality of trained deep RL agents in the one or more controllable electric equipment of the building, wherein
the primary chilled water loop is assigned with a first deep trained RL agent of the plurality of trained deep RL agents,
the secondary chilled water loop is assigned with a second deep trained RL agent of the plurality of trained deep RL agents, and
the air loop is assigned with a third deep trained RL agent of the plurality of trained deep RL agents,
each of the plurality of trained deep RL agents monitors one or more states affecting performance of the one or more controllable electric equipment in the building,
during an execution of each of the plurality of trained RL agents, a reward function is assigned to each of the plurality of trained RL agents,
the reward function comprises an energy component of the one or more controllable electrical equipment and a penalty, and
the reward function comprises an energy component,
the penalty includes a visual feedback of an associated controllable electrical equipment and degradation information of the associated controllable electrical equipment,
the reward function of the first deep trained RL agent is r1=$E_{ch}$+a factor*the visual feedback,
the reward function of the second deep trained RL agent is r2=$E_{pump}$+the factor*$E_{ch}$, and
the reward function of the third deep trained RL agent is r3=$E_{fan}$+a factor1*the visual feedback+a factor2*$E_{ch}$;
trigger each of the plurality of trained deep RL agents to obtain a portion of the reward function associated with another deep RL agent, wherein
a first trained deep RL agent of the plurality of trained deep RL agents obtains a first specific portion of the portion of the reward function from a second trained deep RL agent of the plurality of trained deep RL agents,
the first specific portion of the reward function includes the energy component only, the penalty only or combination of both the energy component and the penalty,
the first specific portion of the reward function include the energy component and the penalty,
the first trained deep RL agent is associated with a first controllable electrical equipment of the one or more controllable electrical equipment,
the second trained deep RL agent is associated with a second controllable electrical equipment of the one or more controllable electrical equipment, and
information on the portion of the reward function is utilized for training the plurality of trained deep RL agents;
estimate, based on the obtained portion of the reward function, a global optimal control parameter list based on at least one optimal control parameter associated with each of the plurality of trained deep RL agents, wherein the optimal control parameter is learnt by each of the plurality of trained deep RL agents during an execution of the plurality of trained deep RL agents deployed in the one or more controllable electric equipment in the building, wherein the optimal control parameter comprises scheduling information of the associated controllable electrical equipment; and
fine tune a plurality of control parameters of the global optimal control parameter list to improve a performance of each of the plurality of trained deep RL agents.

7. The system of claim 6, wherein the one or more controllable electrical equipment comprises one of one or more heating, ventilation, and air conditioning (HVAC) subsystems, one or more lighting equipment, computing loads systems or combinations thereof.

8. The system of claim 6, wherein the one or more states comprise at least one of a temperature, a humidity, one or more ambient parameters, a lighting intensity, and an occupant density.

9. The system of claim 6, wherein the penalty further comprises a thermal feedback.

10. The system of claim 6, wherein the at least one optimal control parameter comprises at least one of a set point temperature, and a lighting intensity set point.

11. One or more non-transitory machine-readable information storage mediums comprising one or more instructions which when executed by one or more hardware processors cause implementing multi-agent deep reinforcement learning for dynamically controlling electrical equipment in buildings by:
obtaining, via the one or more hardware processors, input data comprising (i) a design specification of one or more controllable electrical equipment installed and operating in the building and (ii) design details of the building associated thereof;
generating, via the one or more hardware processors, a simulation model using the input data, wherein the simulation model is built in offline by abstracting complex Heating, ventilation, and air conditioning (HVAC) loops of the building into three loops wherein the three loops are a primary chilled water loop, a secondary chilled water loop, and an air loop, and an energy consumption of the primary loop is $E_{ch}$, an energy consumption of the secondary loop is $E_{pump}$, an energy consumption of the air loop is $E_{fan}$;

training, via the one or more hardware processors, a plurality of deep Reinforcement learning (RL) agents using the generated simulation model, wherein the plurality of deep RL agents interacts with an environment of the building and learns to act using a Markov Decision Process (MDP) method;

deploying, via the one or more hardware processors, each of the plurality of trained deep RL agents in the one or more controllable electric equipment of the building, wherein
- the primary chilled water loop is assigned with a first deep trained RL agent of the plurality of trained deep RL agents,
- the secondary chilled water loop is assigned with a second deep trained RL agent of the plurality of trained deep RL agents, and
- the air loop is assigned with a third deep trained RL agent of the plurality of trained deep RL agents,
- each of the plurality of trained deep RL agents monitors one or more states affecting performance of the one or more controllable electric equipment in the building,
- during an execution of each of the plurality of trained RL agents, a reward function is assigned to each of the plurality of trained RL agents,
- the reward function comprises an energy component of the one or more controllable electrical equipment and a penalty,
- the reward function comprises an energy component, and
- the penalty includes a visual feedback of an associated controllable electrical equipment and degradation information of the associated controllable electrical equipment, the reward function of the first deep trained RL agent is $r1 = E_{ch} + a\ factor * the\ visual\ feedback$,
- the reward function of the second deep trained RL agent is $r2 = E_{pump} + the\ factor * E_{ch}$, and
- the reward function of the third deep trained RL agent is $r3 = E_{fan} + a\ factor1 * the\ visual\ feedback + a\ factor2 * E_{ch}$;

triggering, via the one or more hardware processors, each of the plurality of trained deep RL agents, to obtain a portion of the reward function associated with another deep RL agent, wherein
- a first trained deep RL agent of the plurality of trained deep RL agents obtains a first specific portion of the portion of the reward function from a second trained deep RL agent of the plurality of trained deep RL agents,
- the first specific portion of the reward function includes the energy component only, the penalty only or combination of both the energy component and the penalty,
- the first specific portion of the reward function include the energy component and the penalty,
- the first trained deep RL agent is associated with a first controllable electrical equipment of the one or more controllable electrical equipment,
- the second trained deep RL agent is associated with a second controllable electrical equipment of the one or more controllable electrical equipment, and
- information on the portion of the reward function is utilized for training the plurality of trained deep RL agents;

estimating, via the one or more hardware processors, based on the obtained portion of the reward function, a global optimal control parameter list based on at least one optimal control parameter associated with each of the plurality of trained deep RL agents, wherein the at least one optimal control parameter is learnt by each of the plurality of trained deep RL agents during an execution of the plurality of trained deep RL agents deployed in the one or more controllable electric equipment in the building, wherein the optimal control parameter comprises scheduling information of the associated controllable electrical equipment; and fine tuning a plurality of control parameters of the global optimal control parameter list to improve a performance of each of the plurality of trained deep RL agents.

12. The one or more non-transitory machine-readable information storage mediums of claim 11, wherein the one or more controllable electrical equipment comprises one of one or more heating equipment, a ventilation system, and air conditioning (HVAC) subsystems, one or more lighting equipment, computing loads systems, or combinations thereof.

13. The one or more non-transitory machine-readable information storage mediums of claim 11, wherein the one or more states comprise at least one of a temperature, a humidity, one or more ambient parameters, a lighting intensity, and an occupant density.

14. The one or more non-transitory machine-readable information storage mediums of claim 11, wherein the penalty further comprises a thermal feedback.

15. The one or more non-transitory machine-readable information storage mediums of claim 11, wherein the optimal control parameter comprises at least one of a set point temperature, and a lighting intensity set point.

* * * * *